US012762002B2

(12) United States Patent
Pottier et al.

(10) Patent No.: US 12,762,002 B2
(45) Date of Patent: Oct. 13, 2026

(54) PROCESS SEGMENT AUGMENTATION

(71) Applicant: Arm Limited, Cambridge (GB)

(72) Inventors: Remy Pottier, Grenoble (FR); Stuart David Biles, Bury St. Edmunds (GB); Matthew James Horsnell, Cambridge (GB); Mbou Eyole, Soham (GB); Giacomo Gabrielli, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 18/877,074

(22) PCT Filed: Jun. 21, 2023

(86) PCT No.: PCT/GB2023/051626

§ 371 (c)(1),
(2) Date: Dec. 19, 2024

(87) PCT Pub. No.: WO2024/003529

PCT Pub. Date: Jan. 4, 2024

(65) Prior Publication Data

US 2025/0225020 A1 Jul. 10, 2025

(30) Foreign Application Priority Data

Jun. 28, 2022 (GB) ...................................... 2209465

(51) Int. Cl.
*G06F 11/14* (2026.01)
*G06F 11/07* (2006.01)

(52) U.S. Cl.
CPC ........ *G06F 11/079* (2013.01); *G06F 11/0709* (2013.01); *G06F 11/14* (2013.01);
(Continued)

(58) Field of Classification Search
CPC .. G06F 11/079; G06F 11/0709; G06F 11/142; G06F 11/14; G06F 11/1423; G06N 20/00
See application file for complete search history.

(56) References Cited

U.S. PATENT DOCUMENTS 8,903,983 B2 * 12/2014 Bakman .................. H04L 41/22 718/1
9,811,795 B1 * 11/2017 Kearns ............... G06Q 10/0637
(Continued)

OTHER PUBLICATIONS

Combined Search and Examination Report under Sections 17 and 18(3), App. No. GB2209465.0. Mailed Feb. 27, 2023, 12 pages.
(Continued)

*Primary Examiner* — Jonathan D Gibson
(74) *Attorney, Agent, or Firm* — Berkeley Law & Technology Group, LLP

(57) ABSTRACT

A method of managing network-attachable computing entities comprising: training a machine-learning model to detect a bottleneck process segment in a process flow performed by a network-attachable computing entity; deploying a trained model to monitor a network-attachable computing entity in operation; responsive to detecting an instance of the bottleneck process segment, analyzing to determine a cause of the bottleneck; responsive to determining the cause of the bottleneck, generating an augmented functional unit to address the cause of the bottleneck; and deploying the augmented functional unit to at least one of the network-attached computing entities that has an instance of a process comprising the bottleneck process segment.

13 Claims, 2 Drawing Sheets

Figure 1:
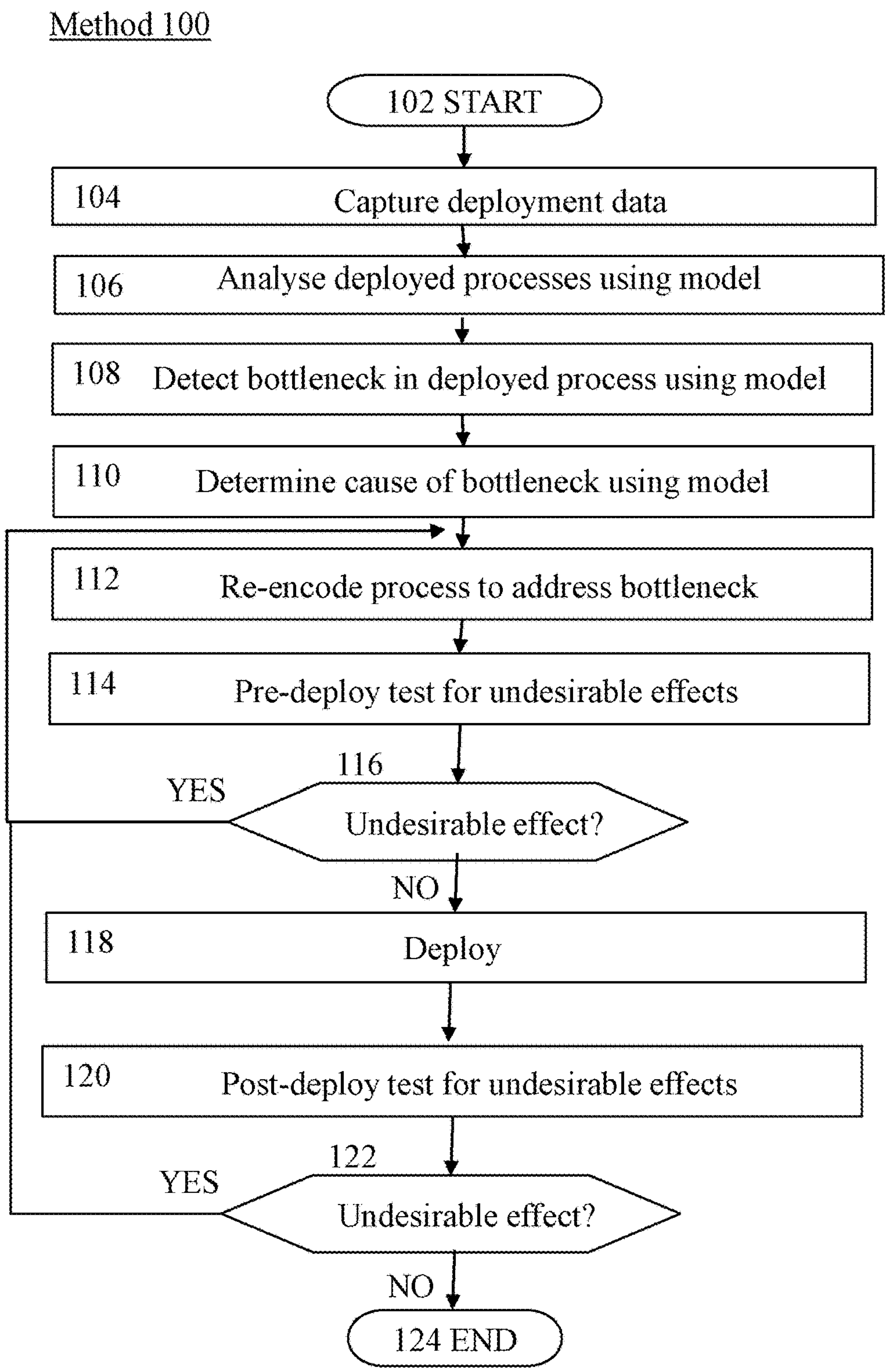

(52) U.S. Cl.
CPC ........ *G06F 11/142* (2013.01); *G06F 11/1423* (2013.01); *G06F 11/1425* (2013.01)

(56) References Cited

U.S. PATENT DOCUMENTS

| | | | | | |
|---|---|---|---|---|---|
| 10,203,991 | B2 * | 2/2019 | Brady | G06F 9/5077 | |
| 10,791,168 | B1 * | 9/2020 | Dilley | H04L 41/22 | |
| 11,010,233 | B1 * | 5/2021 | Golden | G06F 11/0793 | |
| 11,936,757 | B1 * | 3/2024 | Benny | H04L 61/4511 | |
| 2014/0330961 | A1 * | 11/2014 | Agarwala | H04L 47/11 | 709/224 |
| 2019/0163447 | A1 * | 5/2019 | Carey | G06F 8/51 | |
| 2020/0219007 | A1 * | 7/2020 | Byers | G06F 9/50 | |
| 2020/0296172 | A1 * | 9/2020 | Gunjal | G06N 3/0442 | |
| 2021/0303381 | A1 * | 9/2021 | Baldassarre | G06N 5/04 | |
| 2021/0389994 | A1 * | 12/2021 | Malleni | G06F 9/5083 | |
| 2025/0225020 | A1 * | 7/2025 | Pottier | G06F 9/5077 | |
| 2025/0363364 | A1 * | 11/2025 | Galvin | G06N 3/045 | |

OTHER PUBLICATIONS

Notification of Transmittal of the International Search Report and the Written Opinion of the International Searching Authority, or the Declaration, App. No. PCT/GB2023/051626, Mailed Sep. 21, 2023, 15 pages.

Notification Concerning Transmittal of International Preliminary Report on Patentability (Chaper I of the Patent Cooperation Treaty), App. No. PCT/GB2023/051626, Mailed Jan. 9, 2025, 10 pages.

* cited by examiner

PROCESS SEGMENT AUGMENTATION

The present technology relates to managing computing entities that are already deployed in the field, and more particularly to the provision of machine learning technologies for detecting bottlenecks in processing and generating augmented functional units for deployment over a network of computing entities.

Conventionally, once a computing entity, such as a device or a unit of firmware or software, has been deployed in the field, further management, problem fixing, updates and improvements are performed by way of field reports and corrective redistributions of the entity or of individual components of the entity. In one example, a hardware product is deployed in the field and may be replaced with an improved product from time to time. In addition, occasional firmware replacements may be issued to update the control firmware of the hardware product. In cases where field-reconfigurable hardware is in use, reconfigurations may be distributed in the form of hardware descriptor language materials to be applied to reconfigure the hardware logic. In software deployments, updated distributions of the software may be provided at more or less frequent intervals over the supported lifespan of the product. Replacements and updates of this kind may be triggered by an accumulation of problem reports from users in the field, or they may be triggered by a realisation by the product developers that an improvement can be made or a problem fixed.

Typically, however, there is a considerable time lag before a provider will release an update (unless it is security or integrity critical), and the whole process is rather costly in developer time and resource. For these reasons, some types of improvement, such as performance tuning and optimisation of processing, may be supplied rather infrequently, and this can negatively affect the quality of experience perceived by users. While this slowness to respond may have been of less importance in the days of conventional centralised computing systems, now that computing power is distributed widely throughout an ecosystem of processor-equipped appliances (such as the Internet of Things), the effect of delays in providing updates and improvements on users is much more noticeable and has a much greater effect on the quality of experience of everyday users.

There are, of course, barriers to be overcome if such performance improvements are to be made more frequently. For example, it typically takes time for a developer organization to become aware of a performance issue, such as a processing bottleneck in a frequently used functional unit (for example, a library module or often-repeated procedure or routine). There is then normally a delay during which information about the bottleneck is gathered from the deployed units, after which some prioritisation is applied to determine when any development resource is to be given to redevelopment of the product or rework of the process code. The redevelopment or rework takes time, and any changes must then be tested before any deployment and then monitored, at least for some time after the deployment, to ensure that the changes have not had detrimental effects on the security, reliability and integrity of the product and its environment, and that the change to the quality of experience has been achieved.

In a first approach to the many difficulties encountered in addressing the issue of bottlenecks in processing performed by deployed computing entities, the present technology provides a computer implemented method for managing a network-attachable computing entity to detect bottlenecks in processing and generating augmented functional units for deployment over a network of devices, as defined by the appended claims. In a second approach, the present technology provides a method of managing a network-reachable distributed processing initiator, as defined by the appended claims.

The method may be computer-implemented, for example in the form of a computer program product that, when loaded into a computer system and executed, causes the computer system to perform the method according to the claims. There is further provided an apparatus comprising a memory and a processor provided with electronic logic circuitry operable to perform the method.

Figure 2:
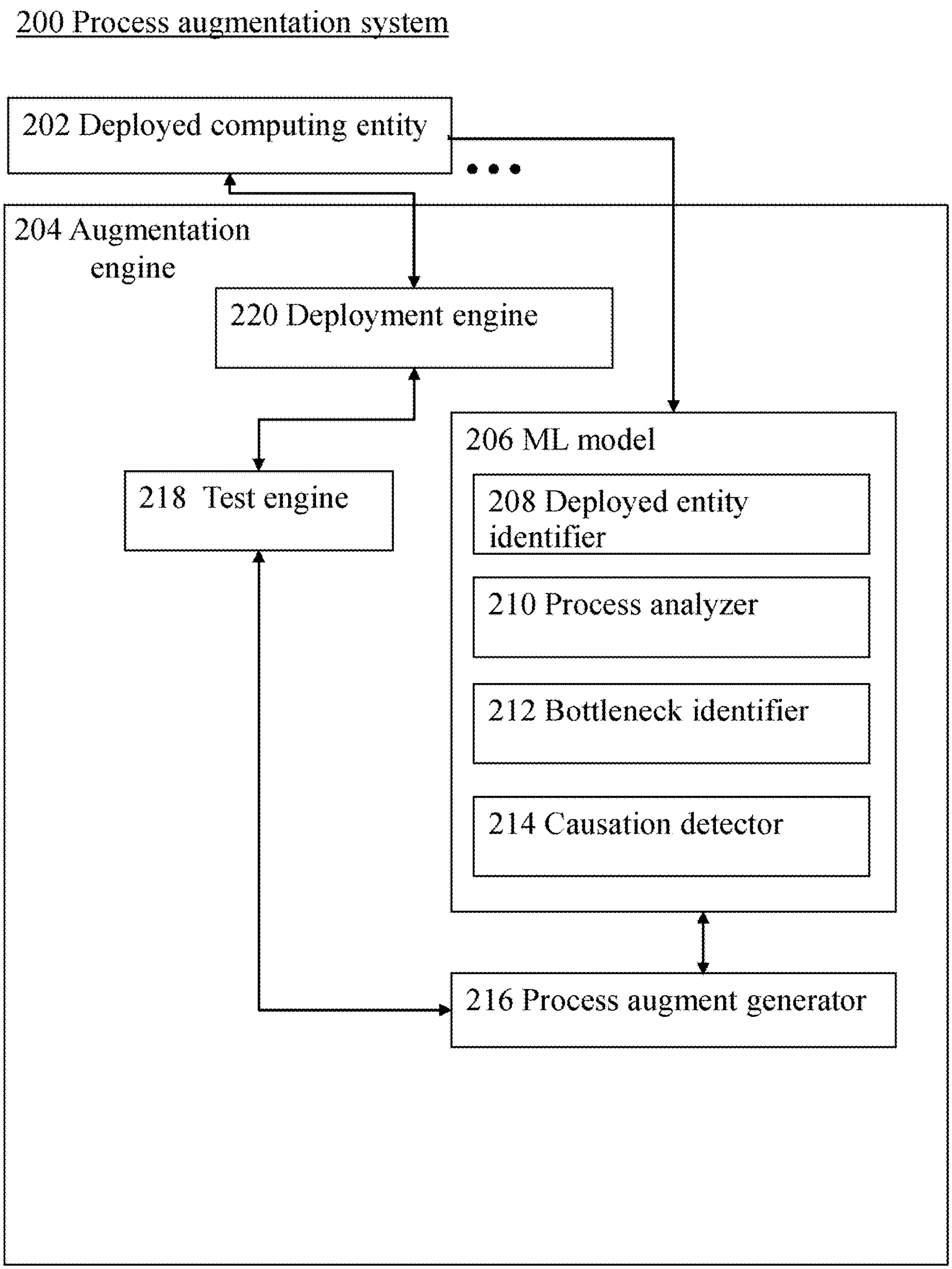

Implementations of the disclosed technology will now be described, by way of example only, with reference to the accompanying drawings, in which:

FIG. 1 shows a simplified view of a method of detecting bottlenecks in processing and generating augmented functional units for deployment over a network of computing entities according to implementations of the presently described technology; and FIG. 2 shows a simplified representation of one possible apparatus, system or arrangement of electronic circuit components operable to detect bottlenecks in processing and to generate augmented functional units for deployment over a network of computing entities according to an implementation of the presently described technology.

As described above, it is desirable to have a technology and process for data driven, automated detection and generation of functional units, such as hardware accelerators and new language and interface structures, leveraging distributed learning techniques that identify potential for hardware optimization across groups of computing entities and workloads. A technology and process to deploy the augmented functional units to all or part of a population of deployed entities in the field may be provided. The deployment may be achieved by transmission of the augmented functional unit to the recipient deployed entities, or it may be achieved by providing the recipient deployed entities with an indication (such as a Universal Resource Indicator) showing where the augmented functional unit has been made available for downloading.

It is further desirable to have a system and method for including an optimization QoE (quality of experience) verification process to evaluate the quality of result, including verifying that the computing entity still does what it is supposed to do by means of a test framework dedicated to changes. The testing may also verify that the operation of the augmented functional unit does not cause any negative effects either on the computing entity to which it has been deployed, or to the wider population of network-attachable computing entities. The test framework may be implemented both as a pre-deployment test, using a reserved test dataset, and as a post-deployment test using feedback from deployed computing entities that operate on real data.

The present technology thus provides apparatus, computer-implemented techniques and logic for detecting bottlenecks in processing and generating augmented functional units for deployment over a network of computing entities.

The present technology is operable in environments of distributed computing entities, where the same processes are performed on multiple computing entities, and where there may be parts of those processes that are constrained for some reason. The present technology is operable to train a machine-learning model to detect bottleneck process segments in process flows performed by at least one of the computing entities. A bottleneck process segment may be, for example, a resource constrained processing path. Typical resource constraints may include, for example, shortages of available memory, instruction fetch latency, data retrieval latency, bandwidth restriction and the like. These and other resource constraints typically have a "signature" that enables them to be identified on analysis by a suitably-trained model-based learning system as bottlenecks in process flows.

The machine-learning model is deployed to monitor the population of computing entities to capture data and recognise the signs of a bottleneck. Monitoring a computing entity in operation may be done by installing model-based instrumentation at the computing entity to capture data for analysis. Monitoring data may thus be gathered from client computing entities (with the client computing entity owner's consent). The duration of data gathering may be modulated, for example, to avoid draining a user's battery (in the case of a battery-powered device) or consuming too much communications bandwidth, or the like. The machine-learning model then applies its learning to determine the cause of the bottleneck, and to generate an augmented functional unit that addresses the cause of the bottleneck.

Training the machine-learning model to detect a bottleneck process segment in a process flow may comprise: training the model to analyse a processing path and generate at least one alternative processing path; comparing the processing path and an alternative processing path to determine which path is the more efficient; generating an augmented functional unit for the more efficient processing path; and deploying the augmented functional unit to at least one computing entity that has an instance of a process comprising the bottleneck process segment. Generating an augmented functional unit may comprise, for example, constructing processing logic using a hardware definition language to apply to a configurable hardware unit, or it may comprise, in another example, constructing an instruction set extension.

If the monitoring detects more than one bottleneck process segment, the present technology may establish a priority order for handling the bottlenecks in response to deployment constraints, for example by determining which bottleneck is more widespread in the population of computing entities, or which bottleneck is causing the most processing delays.

If the technology recognises that a current bottleneck has similar characteristics to a previously encountered bottleneck, it may reuse a previously-generated augmented functional unit as a basis.

As will be clear to one of ordinary skill in the art, the present technology is operable in various computing-enabled environments, including, for example, conventional distributed processing environments of multiple cooperating servers, as well as cloud computing environments and the Metaverse, where it may combine with other technologies in the hyperpersonalization of computing.

Advantageously, the present technology is autonomous in operation-once the model-based machine learning system is activated, it operates to monitor the reachable computing entities on the network to detect bottlenecks, generates appropriate augmented functional units to address those bottlenecks, performs pre-deployment tests, deploys the augmented functional units, and applies post-deployment tests, all without the need for human input or control.

"Bottleneck," as used in the present description, may refer to any constraint that may limit the process efficacy, efficiency, throughput or resource available to be applied to the processing of data by any deployed computing entity.

"Functional units," as used in the present description, may refer to electronic logic programmed into hardware, firmware or software elements. Hardware may take the form of reconfigurable hardware units that can be dynamically reconfigured as needed.

"Augmented," as used in the present description, may refer to additions of logic or code elements, deletions of logic or code elements, replacements of logic or code elements, or manipulations of data structures and formats. The form of augmentation depends on the discovered bottleneck and on the learned practice and optimisation rules embodied in the machine-learning model that analyses the data relating to the bottleneck.

"Computing entity," as used in the present description may refer to a hardware device, which may be reconfigurable as needed, or to a firmware or software entity, which may be installed on a hardware device, or which may comprise distributed processing elements installed on plural devices. For example, a computing entity may comprise a virtual machine established on an infrastructure, such as a cloud computing infrastructure.

Computing entities that may benefit from the present technology are network-attachable, that is, they are provided with the means to attach to communications networks either in the form of a static attachment, via cable, or in the form of wireless attachments. In one example, a wirelessly networked computing entity may be intermittently attachable to a Bluetooth® network, or it may be attachable via a WiFi® network. As will be clear to one of ordinary skill in the art, various other forms of static and intermittent network attachment may be equally advantageously used with the present technology.

Turning now to FIG. 1, there is shown a very simplified view of a method 100 of detecting bottlenecks in processing and generating augmented functional units for deployment over a network of devices according to implementations of the presently described technology.

At 104, deployment data relating to the deployed computing entity is captured. For example, a query may be issued over a network to discover and identify all instances of the deployed computing entity. In a temporally-unrelated manner, a model-based learning system is applied at 106 to analyse data relating to deployed processes, and to detect at 108 any bottlenecks in the processing performed by functional units of the deployed computing entity. As will be clear to one of ordinary skill in the art, 104, 106 and 108 may be carried out in different orders, and may be carried out in many iterations—for example, deployed entities may be instrumented with distributed learning tools to monitor processes and to retain monitoring data for supply during 106, 108. Thus, the application of the model-based learning system may form part of an ongoing monitoring and survey activity.

If a bottleneck is detected at 108, the model is activated at 110 to determine the cause of the bottleneck. As will be clear to one of ordinary skill in the art, the model will previously have been trained over a large collection of relevant data to recognise the patterns in electronic logic behaviour, code behaviour and data transformation that indicate why a process is being hindered. The cause of the bottleneck being determined at 108, at 110, a further aspect of the model's learning is applied to decide upon the best available corrective action to provide an augmented functional unit, for example, by re-encoding the process—that is, to restructure the processing logic, whether hardware, firmware or software; or to modify the structures or data that are being manipulated—to address the bottleneck and reduce its effect upon the computing entity. In one embodiment, the model may query reachable computing entities to find any pre-existing solutions, in the form of augmented functional units—to the same problem. The model may also have a library of adaptable logic segments that may be used to augment functional units by replacing logically cognate segments of processing logic where the model determines that there is a deterministic flow from input to output of a process segment and that that deterministic flow is susceptible to improvement in processing efficiency.

When the augmented functional unit has been encoded, it is tested at 114, both to ensure that the improvement has been made, but also to ensure that no disadvantageous effects will be caused by its deployment in the field. The augmented functional unit may be tested against a set of test data selected according to the typical operation of the process in normal use in the field. The forms of testing that are available will be well known to all those of ordinary skill in the art, and need not be enumerated here. Should undesirable effects be noted at 116, the re-encoding process may be repeated and re-tested at 112 and 114 until the pre-deployment test is passed at 114, or until no further iterations are possible. Should no undesirable effects be noted at 116, the re-encoded process logic is deployed at 118. Typically, field testing may be applied—as shown at 120, where the augmented functional unit is tested post-deployment. Should no undesirable effects be noted at 122, this iteration of the method completes at END 124. It will be clear to one of ordinary skill in the art that END 124 represents the end only of this iteration of the method 100, and further iterations may be performed. Should undesirable effects be noted at 122, the re-encoding process may be repeated and re-tested until the post-deployment test is passed at 122, or until no further iterations are possible. In this way, it is determined both that the augmented functional unit is achieving its aim of improving the efficiency of the process, and that its operation is not having adverse effects on either the computing entity on which it has been deployed, or on the wider population of network attachable computing entities.

As will be clear to one of ordinary skill in the art, the deployment of an augmented functional unit may be universal to a deployed population of computing entities, or it may be limited to selected entities based on various criteria, such as, for example, criticality levels established across the system of computing entities, or, for example, settings established by a computing entity in its system definition.

In this manner, a model-based learning system may be applied to addressing process bottlenecks in deployed computing entities by breaking down a process into subgraphs to determine where a bottleneck exists, encoding augmented functional units that address the cause of the bottleneck, and deploying the augmented functional units to computing entities deployed in the field.

Turning now to FIG. 2, there is shown a simplified representation of one possible apparatus, system or arrangement of electronic circuit components forming a process augmentation system 200 operable according to an implementation of the presently described technology.

Process augmentation system 200 comprises augmentation engine 204 arranged in electronic communication with deployed computing entities 202 . . . ("202 . . . " being used here to represent a population of deployed computing entities). Augmentation engine comprises machine learning (ML) model 206, which comprises deployed entity detector, operable to identify deployed computing entities that may contain processes subject to bottlenecks. Deployed computing entities 202 . . . that have been so identified are operable to provide data to ML model, which comprises a process analyser operable to break down processes into process flow subgraphs for processing by bottleneck identifier 212. Bottleneck identifier 212 recognises instances of process delay and passes them to causation detector 214, which is operable to analyse instances of process delay by comparing with learned instances of process flow subgraphs that achieve a suitable correspondence with respect to desired functionality and other predetermined criteria, but that do not suffer process delay. Causation detector 214 is thus operable to isolate process flow subgraphs and to provide process augment generator 216 with alternative process flow data that enables process augment generator 216 to determine a more efficient processing path and to generate an encoding for that more efficient processing path. As described above, the encoding may take the form of a software-implemented functional unit or it may comprise a logic descriptor of a functional unit for application to a reconfigurable hardware arrangement.

Process augment generator 216 is arranged in communication with test engine 218, which is operable to perform testing to determine (a) whether the encoding of the functional unit developed by process augment generator 216 provides an improvement that addresses the bottleneck identified by bottleneck identifier 212, and (b) whether the operation of the encoding developed by process augment generator 216 causes undesirable effects when applied to typical workload data. Test engine 218 is operable to respond to negative outcomes of testing by re-invoking process augment generator 216 with test result data for use in generating at least a further instance of an encoding for the more efficient processing path. Test engine 218 is operable to respond to positive outcomes of testing by invoking deployment engine 220, which is operable to deploy the augmented functional unit to at least a subset of deployed computing entities 202 . . . . Deployment engine 220 is further operable to provide post-deployment operational data to test engine 218, which can thus perform post-deployment testing to confirm that the deployed augmented functional unit provides an improvement that addresses the bottleneck identified by bottleneck identifier 212, and that the operation of deployed augmented functional unit does not cause undesirable effects when applied to actual workload data.

In one example implementation, there may be provided a machine-learning model that can recognize previously learnt functions, and can reduce a processing path length by replaying a learnt function or a combination of learnt functions autonomously, by searching an index space of learnt functions, or by analyzing and clustering inputs to identify which input should with high probability create similar output and re-creating the pattern instead of re-running the complete processing path. In collaborating distributed system environments, where a local improvement has been made to a processing path, it may be possible for the present technology to canvass the network of reachable computing entities to search for pre-existing "local" augmentations already operational in at least one computing entity, and any such pre-existing "local" augmentations may then be retrieved and prepared for deployment to the wider population of computing entities.

At a CPU level, the present technology may be implemented as a predictive structure in the CPU that may activate a dynamic learning phase every time it sees a new application. A library of computing process bottlenecks and a library of learnt functions may be developed for use, respectively, in recognizing bottlenecks and addressing them.

In a further variant, the present technology may be applied to create libraries of augmented functional units that may be stored for future use—for example, for incorporation during development into future computing entities.

The present technology has the additional advantage that its application is more realistic than running synthetic benchmarks and optimising scenarios which might not arise in practice or even apply to a specific user. As will be clear to one of skill in the art, the selective nature of the optimisations of the present technology has advantages over the conventional approach-sometimes blanket optimisations (optimizations that target an average case, but are rolled out to all or a majority of users) can be detrimental to some users, and this can be avoided by use of the present technology.

As will be appreciated by one skilled in the art, the present technique may be embodied as a system, method or computer program product. Accordingly, the present technique may take the form of an entirely hardware embodiment, an entirely software embodiment, or an embodiment combining software and hardware. Where the word "component" is used, it will be understood by one of ordinary skill in the art to refer to any portion of any of the above embodiments.

Furthermore, the present technique may take the form of a computer program product embodied in a non-transitory computer readable medium having computer readable program code embodied thereon. The computer readable medium may be a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object-oriented programming languages and conventional procedural programming languages.

For example, program code for carrying out operations of the present techniques may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high speed integrated circuit Hardware Description Language).

The program code may execute entirely on the user's computer, partly on the user's computer and partly on a remote computer or entirely on the remote computer or server. In the latter scenario, the remote computer may be connected to the user's computer through any type of network. Code components may be embodied as procedures, methods or the like, and may comprise sub-components which may take the form of instructions or sequences of instructions at any of the levels of abstraction, from the direct machine instructions of a native instruction-set to high-level compiled or interpreted language constructs.

It will also be clear to one of skill in the art that all or part of a logical method according to embodiments of the present techniques may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored using fixed carrier media.

In one alternative, an embodiment of the present techniques may be realized in the form of a computer implemented method of deploying a service comprising steps of deploying computer program code operable to, when deployed into a computer infrastructure or network and executed thereon, cause said computer system or network to perform all the steps of the method.

In a further alternative, an embodiment of the present technique may be realized in the form of a data carrier having functional data thereon, said functional data comprising functional computer data structures to, when loaded into a computer system or network and operated upon thereby, enable said computer system to perform all the steps of the method.

It will be clear to one skilled in the art that many improvements and modifications can be made to the foregoing exemplary embodiments without departing from the scope of the present technique.

The invention claimed is:

1. A computer implemented method of managing network-attachable computing entities comprising:

training a machine-learning model to detect a bottleneck process segment in a process flow performed by at least a first network-attachable computing entity;

deploying a trained said model to monitor at least said first network-attachable computing entity in operation;

responsive to detection of an instance of said bottleneck process segment, analyzing said bottleneck process segment to determine a cause of said bottleneck process segment;

responsive to determining said cause of said bottleneck process segment, generating an augmented functional unit to address said cause of said bottleneck process segment; and deploying said augmented functional unit to said first network-attachable computing entity and a further network-attachable computing entity having an instance of a process comprising said bottleneck process segment.

2. The method according to claim 1, said analyzing said bottleneck process segment to determine a cause of said bottleneck process segment comprising recognizing signature characteristics of process elements that cause bottlenecks.

3. The method according to claim 1, said training a machine-learning model to detect a bottleneck process segment in a process flow comprising training said model to analyze a processing path and generate at least one alternative processing path.

4. The method according to claim 3, further comprising comparing said processing path and said at least one alternative processing path to determine which path is a more efficient processing path.

5. The method according to claim 4, said generating an augmented functional unit comprising generating an encoding for said more efficient processing path for the process flow.

6. The method according to claim 1, said generating an augmented functional unit comprising constructing processing logic using a hardware definition language to apply to a configurable hardware unit.

7. The method according to claim 1, said generating an augmented functional unit comprising constructing an instruction set extension.

8. The method according to claim 1, said bottleneck process segment comprising a resource constrained processing path.

9. The method according to claim 1, responsive to detection of more than one instance of said bottleneck process segment, establishing a priority order for handling said more than one instance of said bottleneck process segment.

10. The method according to claim 1, said generating an augmented functional unit to address said cause of said bottleneck process segment further comprising recognizing a previously encountered bottleneck and reusing a prior generated functional unit as a basis for said generating.

11. The method according to claim 1, said deploying a trained said model to monitor at least said first network-attachable computing entity in operation comprising installing model-based instrumentation at said first network-attachable computing entity to capture data for analysis.

12. An apparatus comprising: a processor, a data storage component coupled to the processor, wherein the processor is to:

train a machine-learning model to detect a bottleneck process segment in a process flow performed by at least a first network-attachable computing entity;

deploying a trained said model to monitor at least said first network-attachable computing entity in operation;

responsive to detection of an instance of said bottleneck process segment, analyze said bottleneck process segment to determine a cause of said bottleneck process segment;

responsive to determination of said cause of said bottleneck process segment, generate an augmented functional unit to address said cause of said bottleneck process segment; and deploy said augmented functional unit to said first network-attachable computing entity and a further network-attachable computing entity having an instance of a process comprising said bottleneck process segment.

13. A computer program comprising computer program code stored on a non-transitory computer-readable medium to, when loaded into a computer system and executed thereon, cause said computer system to:

train a machine-learning model to detect a bottleneck process segment in a process flow performed by at least a first network-attachable computing entity;

deploying a trained said model to monitor at least said first network-attachable computing entity in operation;

responsive to detection of an instance of said bottleneck process segment, analyze said bottleneck process segment to determine a cause of said bottleneck process segment;

responsive to determination of said cause of said bottleneck process segment, generate an augmented functional unit to address said cause of said bottleneck process segment; and deploy said augmented functional unit to said first network-attachable computing entity and a further network-attachable computing entity having an instance of a process comprising said bottleneck process segment.

* * * * *